US007186124B2

(12) United States Patent
Chen et al.

(10) Patent No.: US 7,186,124 B2
(45) Date of Patent: Mar. 6, 2007

(54) SENSOR MODULE FOR CARD CONNECTOR AND CARD CONNECTOR HAVING SUCH SENSOR MODULE

(75) Inventors: Benny Chen, Taoyuan Hsien (TW); Aruong Juang, Ping-Chen (TW)

(73) Assignee: FCI, Versailles (FR)

( * ) Notice: Subject to any disclaimer, the term of this patent is extended or adjusted under 35 U.S.C. 154(b) by 0 days.

(21) Appl. No.: 10/523,125

(22) PCT Filed: Jul. 31, 2003

(86) PCT No.: PCT/SG03/00183

§ 371 (c)(1), (2), (4) Date: Jan. 17, 2006

(87) PCT Pub. No.: WO2004/015817

PCT Pub. Date: Feb. 19, 2004

(65) Prior Publication Data

US 2006/0105599 A1 May 18, 2006

(30) Foreign Application Priority Data

Jul. 31, 2002 (TW) .............................. 91117139 A

(51) Int. Cl.
*H01R 29/00* (2006.01)

(52) U.S. Cl. .................................................... 439/188

(58) Field of Classification Search ............... 439/188, 439/630–635, 489

See application file for complete search history.

(56) References Cited

U.S. PATENT DOCUMENTS

| | | | | |
|---|---|---|---|---|
| 4,900,273 | A | 2/1990 | Pernet | 439/630 |
| 5,370,544 | A * | 12/1994 | Reichardt et al. | 439/188 |
| 6,132,229 | A | 10/2000 | Wu | 439/188 |
| 6,159,051 | A | 12/2000 | Chang | 439/630 |
| 6,425,775 | B1 * | 7/2002 | Chang et al. | 439/188 |
| 2002/0067162 | A1 | 6/2002 | Dammkohler et al. | 324/207.21 |

FOREIGN PATENT DOCUMENTS

| | | |
|---|---|---|
| EP | 0 231 409 | 8/1987 |

* cited by examiner

*Primary Examiner*—Ross Gushi
(74) *Attorney, Agent, or Firm*—Harrington & Smith, PC

(57) ABSTRACT

Disclosed is a sensor module (100) for a card connector (50), the connector having an inlet end (52) through which the card is inserted, and a terminating (54) end opposing the inlet (52) end, characterized in that: the sensor module (100) is provided at the terminating end (54) and activated by a leading edge of the card from a normally non-actuated position to an actuated position. Further disclosed is a card connector (50) having such a sensor module (100).

24 Claims, 4 Drawing Sheets

130 100 116 110 140 142 120

140 100 56 59 54 58 50 52

SENSOR MODULE FOR CARD CONNECTOR AND CARD CONNECTOR HAVING SUCH SENSOR MODULE

FIELD OF INVENTION

This invention is related to a sensor module for card connector and card connector having such sensor module, for further reducing an overall thickness of the card connector.

BACKGROUND OF INVENTION

Connectors capable of receiving a smart card are currently available in the market. A major plane of a conventional smart card is generally provided with an IC chip for storing information. After inserting the smart card into a compatible connector, the IC chip is electrically connected to a connecting means that can access information stored in the IC chip. Known designs for such a connecting means are disclosed in U.S. Pat. Nos. 4,900,273 and 6,159,051. The "major plane" referred to in this invention is directed to a plane constructed by a length direction and width direction of an object.

To ensure that the connecting means is activated to access the information stored in the IC chip only after the IC chip of the smart card has reached the designated position, a card sensor is integrally provided to the connecting means according to U.S. Pat. Nos. 4,900,273 and 6,159,051.

The integral design of the card sensor with the connecting means in the known designs results in a higher cost. As exemplified by U.S. Pat. No. 6,159,051, the card sensor is co-molded to the connecting means such that its manufacturing cost is relatively high. Furthermore, an alternative connecting means must be manufactured for applications that do not require a card sensor, such that the interchangeability of the connecting means in an assembly line is relatively limited.

Furthermore, to meet the consumers' demands for further reducing the weight and size of computer products, the thickness of a portable computer is a major concern for the consumers in selecting a portable computer. To further reduce the thickness of the portable computer, the computer manufacturers have been striving to reduce the sizes of various components, even by a difference of 2 to 3 mm, in order to reduce the overall thickness of the portable computer products.

SUMMARY OF INVENTION

In view of the integral design of the card sensor with the connecting means found in the known designs, it is a primary objective of this invention to provide a sensor module that is a single unit module independent from the connecting means. The term "module" referred to in this invention is directed to a single component independent from the connecting means.

It is another objective of this invention to provide a single unit module that is activated by a leading edge of a card to be inserted but not by a major plane of the card. In other words, the activating direction is on the same plane of the card so as to further reduce its overall thickness, such that after the sensor module is assembled to a card connector, a low profile card connector may be obtained. The "leading edge" referred to in this invention is directed to an end edge of the card that is first inserted into the card connector.

To achieve the above objectives, this invention discloses a sensor module for a card connector, the connector having an inlet end through which the card is inserted, and a terminating end opposing the inlet end, characterized in that: the sensor module is provided at the terminating end and activated by a leading edge of the card from a normally non-actuated position to an actuated position.

According to one embodiment of this invention, the sensor module comprises: a first contact and a second contact, each having a first section and a second section, and the non-actuate position such that the second sections are substantially parallel to one another in a normally non-contact arrangement.

The structures and characteristics of this invention can be realized by referring to the appended drawings and explanations of the preferred embodiments.

DETAILED DESCRIPTIONS OF EMBODIMENTS

Figure 1:
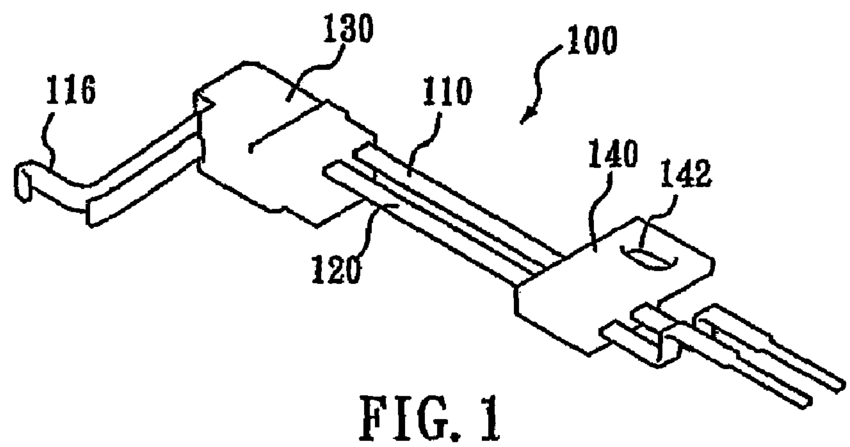
FIG. 1 is a perspective view of a sensor module according to this invention.
Figure 2:
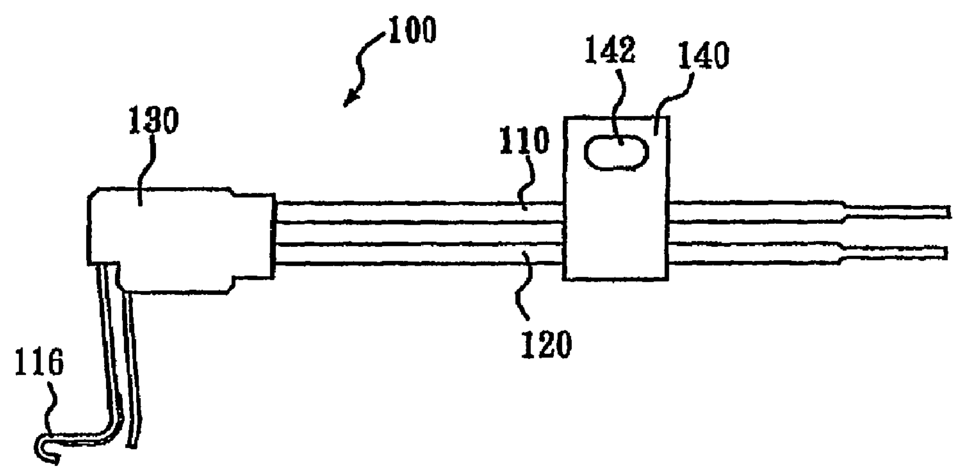
FIG. 2 is a plan view of a sensor module according to this invention.
Figure 6:
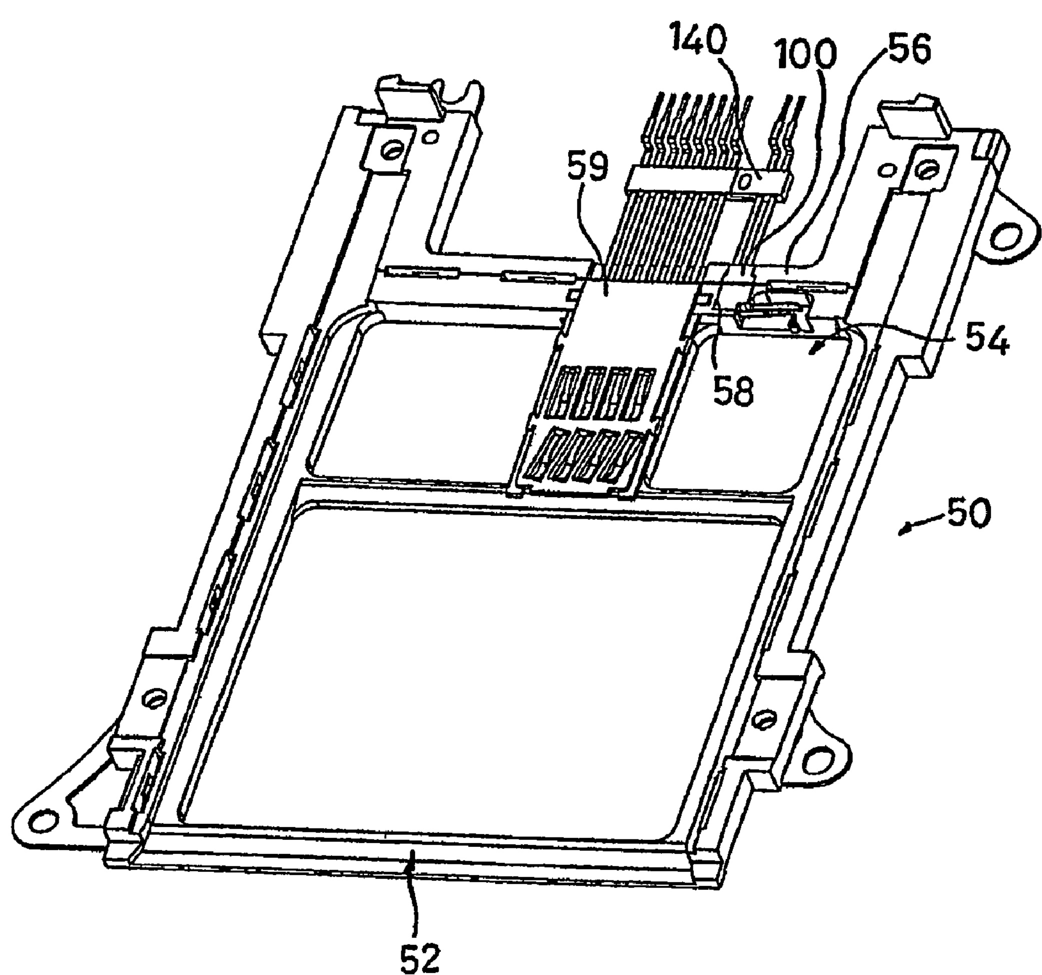
FIG. 6 is a perspective view illustrating the sensor module in FIG. 1 being assembled to a card connector.

FIG. 1 is a perspective view of a sensor module 100 according to this invention. FIG. 2 is a plan view of the sensor module 100. FIG. 6 is a perspective view illustrating the sensor module 100 being assembled to a card connector 50.

With reference to FIG. 6, the card connector 50 includes an inlet end 52 through which a card, such as a smart card (not shown), may be inserted, and a terminating end 54 opposing the inlet end 52, With reference to FIGS. 1 and 2, the sensor module 100 is provided at the terminating end 54 and arranged in such a manner that the sensor module 100 is activated by a leading edge of the card from a normally non-actuated position to an actuated position.

As shown in FIG. 2, to allow the sensor module 100 to be activated by the leading edge of the card, the sensor module includes: a first contact 110 and a second contact 120.

Figure 3A:
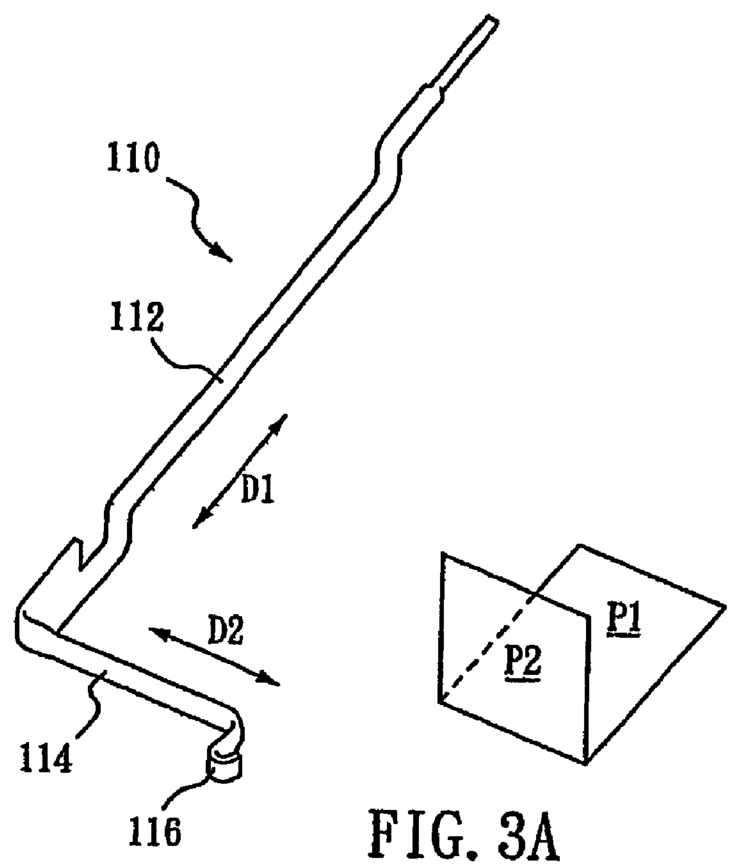
FIG. 3A is a perspective view of a first contact of the sensor module prior to overmolding.
Figure 3B:
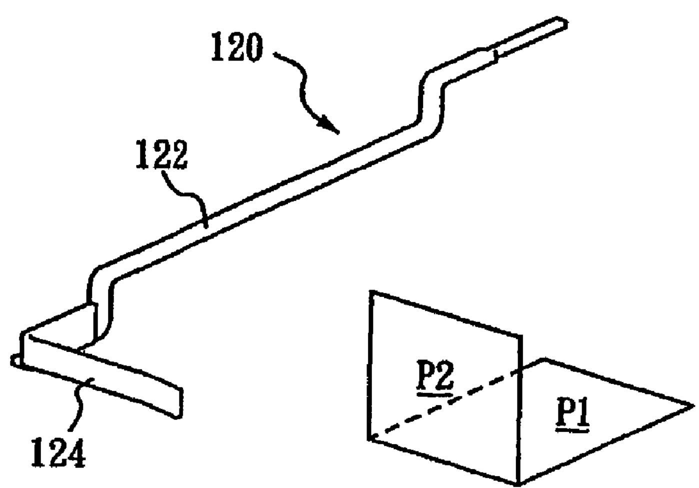
FIG. 3B is a perspective view of a second contact of the sensor module prior to overmolding.

FIG. 3A is a perspective view of the first contact 110 of the sensor module prior to being overmolded into the sensor module 100; FIG. 3B is a perspective view of the second contact 129 of the sensor module prior to being overmolded into the sensor module 100.

As shown in FIGS. 3A and 3B, the first contact 110 has a first section 112 and a second section 114, and the second contact 120 also has a first section 122 and a second section 124. A major plane P1 of each of the first sections 112, 122 of the first and second contacts 110, 120 extends in a first direction D1 that is parallel to a direction along which the card is inserted. A major plane P2 of each of the second sections 114, 124 of the first and second contacts 110, 122 extends in a second direction D2 along which the leading edge of the card extends and that is normal to the first direction D1.

Preferably, the first contact 110 and second contact 120 are stamped from rolled metal sheet of conductive material having suitable spring properties or made by any other appropriate manufacturing processes.

Figure 4:
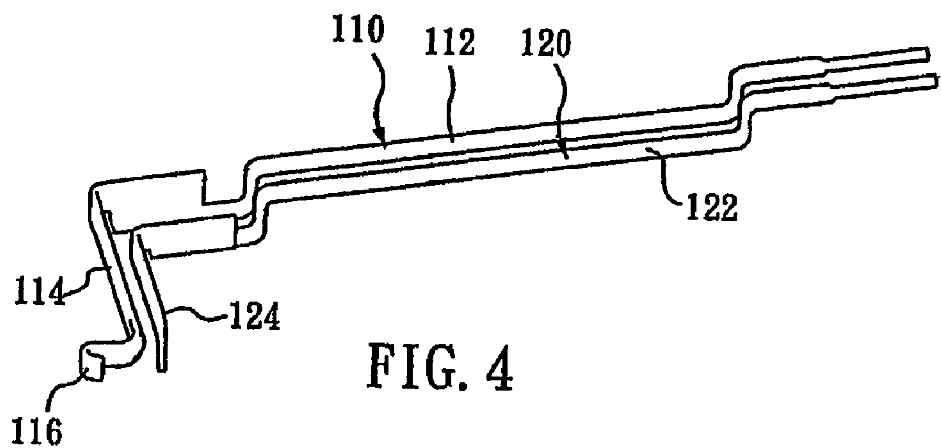
FIG. 4 is a perspective view illustrating the contacts in FIGS. 3A and 3B being arranged in a substantially juxtaposed arrangement.

FIG. 4 is perspective view illustrating a state where the first contact 110 and the second contact 120 shown in FIGS. 3A and 3B are arranged in parallel. At this time, transitions of the first sections 112, 122 and the second sections 114, 124 of the first and second contacts 110, 120 are overmolded by a first overmolding body 130 to maintain the second sections 114, 124 of the first and second contacts 110, 120 at a substantially parallel and normally non-contact arrangement, that is, the non-actuated (or normally open) position shown in FIG. 1.

Figure 5:
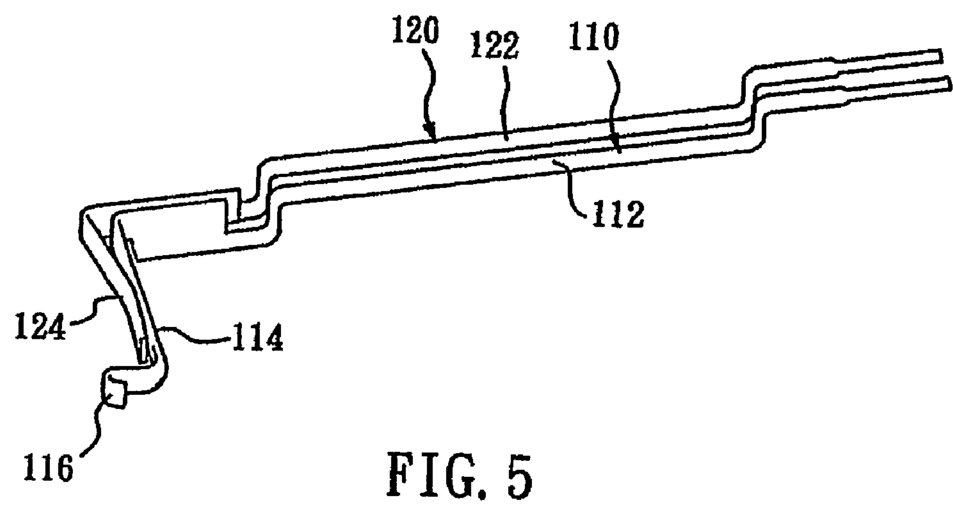
FIG. 5 is a perspective view illustrating an alternative embodiment of this invention.

FIG. 5 illustrates an alternative embodiment, wherein the first contact 110 and a second contact 120 illustrated in FIGS. 3A and 3B, respectively, are arranged in a substantially parallel arrangement with the second sections 114, 124 of the first and second contacts 110, 120 converging towards one another. At this time, transitions of the first sections 112, 122 and the second sections 114, 124 of the first and second contacts 110, 120 are overmolded by a first overmolding body 130 to maintain the second sections 114, 124 of the first and second contacts 110, 120 at a normally contact arrangement, that is, an alternative non-actuated (or normally closed) position shown for the alternative embodiment.

As shown in FIGS. 1 and 2, the second section 112 of the first contact 110 11 preferably includes an extension section 116, that first comes into contact with the leading edge of the card to be inserted. When using the sensor module 100 shown in FIGS. 1 and 4, the second section 114 of the first contact 110 is driven by the leading edge of the card to contact the second section 124 of the second contact 120 when the extension section 116 comes into contact with the leading edge of the card so as to assume the actuated position, such that an electrical signal is generated to ensure that the card has reached a designated position in the card connector 50.

When using the sensor module 100 shown in FIG. 5, the second section 114 of the first contact 110 is driven by the leading edge of the card to separate from the second section 124 of the second contact 120 when the extension section 116 comes into contact with the leading edge of the card so as to assume the open position, such that an electrical signal is generated to ensure that the card has reached a designated position in the card connector 50.

With reference to FIG. 6, to allow easy assembly of the two sensor modules 110 shown in FIGS. 4 and 5 into the card connector 50 shown in FIG. 6, an indent 58 is formed at an appropriate location of a housing 56 of the card connector 50, the indent 58 having a configuration compliant to a configuration of the first overmolding body 130 for assembling and securing the sensor module 100 to the housing 56.

The sensor module 100 may further include a second overmolding body 149 overmolding the first and second contacts 110, 120 at locations distant from the first overmolding body 130. In addition, the second overmolding body 130 may further include a locking mechanism 142, such as an aperture, adapting to a compliant part provided on a connecting means 59 of the card connector 50 so as to lock the sensor module 100 to the connecting means 59.

The sensor module 100 according this invention may also be implemented in a conventional, stacked card media connector, so long as the housing 56 is further defined with a second storage area for receiving a second card-like media, wherein the second storage area is stacked above a first storage area defined by the housing 56.

As shown in FIG. 6, because the single unit sensor module 100 is activated by a leading edge of a card to be inserted but not by a major plane of the card, the activating direction is on the same plane of the card so as to eliminate the space required for activation by the card along a direction normal to the major plane, such that the overall thickness of the card connector 50 may be reduced while obtaining a low profile card connector at the same time.

In addition, the single unit module independent from the connecting means need not be co-molded to the connecting means, such that elimination of the process for assembling the card sensor to the card connector will provide a card connector used for applications that do not require a card sensor, to improve the interchangeability of the connecting means in an assembly line.

This invention is related to a novel creation that makes a breakthrough in the art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

LISTING OF NOMENCLATURES

| | |
|---|---|
| 50 | card connector |
| 52 | inlet end |
| 54 | termination end |
| 56 | housing |
| 58 | indent |
| 59 | connecting means |
| 100 | sensor module |
| 110 | first contact |
| 112 | first section of first contact |
| 114 | second section of first contact |
| 116 | extension of first contact |
| 120 | second contact |
| 122 | first section of second contact |
| 124 | second section of second contact |

What is claimed is:

1. A sensor module for a card connector activable by a leading edge of a card from a normally non-actuated position to an actuated position, the sensor module comprising a first contact and a second contact, wherein the first contact and the second contact each comprises a first section and a second section, wherein the first contact and the second contact are overmolded by a first overmolding body at transitions of the first section and the second section.

2. The sensor module of claim 1, wherein the first overmolding body is capable of maintaining the first contact and the second contact at a normally contact arrangement such that the second sections are converged towards one another.

3. The sensor module of claim 2, wherein the second section of the first contact includes an extension section that first comes into contact with the leading edge of the card.

4. The sensor module of claim 3, wherein the second section of the first contact is driven by the leading edge of the card to separate from the second section of the second contact when the extension section comes into contact with the leading edge of the card so as to assume the actuated position.

5. The sensor module of claim 1, wherein the first overmolding body is capable of maintaining the first contact and the second contact at a normally non-contact arrangement such that the second sections are substantially parallel to one another.

6. The sensor module of claim 5, characterized in that: major planes of the first sections of the first and second contacts extend in a first direction, and major planes of the second sections of the first and second contacts extend in a second direction normal to the first direction.

7. The sensor module of claim 6, wherein the first direction is parallel to a direction along which the card is inserted, and the second direction is along which the leading edge of the card extends.

8. The sensor module of claim 5, wherein the second section of the first contact includes an extension section that first comes into contact with the leading edge of the card.

9. The sensor module of claim 8, wherein the second section of the first contact is driven by the leading edge of the card to contact the second section of the second contact when the extension section comes into contact with the leading edge of the card so as to assume the actuated position.

10. A card connector, comprising:

a housing defining a first storage area for receiving a card, and including a connecting means for connecting the card, the first storage area having an inlet end through which the card is inserted, and a terminating end opposing the inlet end; and a sensor module provided at the terminating end and activable by a leading edge of the card from a normally non-actuated position to an actuated position, wherein the sensor module comprises a first contact and a second contact, wherein the first contact and the second contact each comprises a fist section and a second section, and wherein the first contact and the second contact are overmolded by a first overmolding body at transitions of the first section and the second section.

11. The card connector of claim 10, wherein the first overmolding body is assembled to the housing.

12. The card connector of claim 10, wherein the first overmolding body is capable of maintaining the first contact and the second contact at a normally contact arrangement such that the second sections are converged towards one another.

13. The card connector of claim 12, wherein the second section of the first contact includes an extension section first comes into contact with the leading edge of the card.

14. The card connector of claim 13, wherein the second section of the first contact is driven by the leading edge of the card to separate from the second section of the second contact when the card comes into contact with the leading edge of the card so as to assume the actuated position.

15. The card connector of claim 10, wherein the sensor module further comprises a second overmolding body overmolding the first and second contacts at locations distant from the first overmolding body.

16. The card connector of claim 15, wherein the second overmolding body includes a locking mechanism to be locked to the connecting means.

17. The card connector of claim 16, wherein the locking mechanism is an aperture.

18. The card connector of claim 10, wherein the first overmolding body is capable of maintaining the first contact and the second contact at a normally non-contact arrangement such that the second sections are substantially parallel to one another.

19. The card connector of claim 18, wherein the second section of the first contact includes an extension section that first comes into contact with the leading edge of the card.

20. The card connector of claim 19, wherein the second section of the first contact is driven by the leading edge of the card to contact the second section of the second contact when the card comes into contact with the leading edge of the card so as to assume the actuated position.

21. The card connector of claim 18, wherein major planes of the first sections of the first contact and the second contact extend in a first direction, and major planes of the second sections of the first contact and the second contact extend in a second direction normal to the first direction.

22. The card connector of claim 21, wherein the first direction is parallel to a direction along which the card is inserted into the first storage area, and the second direction is that along which the leading edge of the card extends.

23. A sensor module for a card connector activable by a leading edge of a card from a normally non-actuated position to an actuated position, wherein the sensor module comprises a first contact and a second contact, wherein the first contact and the second contact each comprise a first section and a second section, wherein major planes of the first sections of the first contact and the second contact extend in a first direction, wherein major planes of the second sections of the first contact and the second contact extend in a direction normal to the first section, wherein the first direction is parallel to an insertion direction of the card, wherein the second direction is a direction extending along the leading edge of the card, and wherein the first contact and the second contact are overmolded by a first overmolding body at transitions of the first section and the second section.

24. A card connector comprising:

a housing defining a first storage area for receiving a card, wherein the housing comprises a connecting means for connecting the card, wherein the first storage area comprises an inlet end through which the card is inserted and a terminating end opposing the inlet end; and a sensor module as in claim 23.

* * * * *